(12) United States Patent
Beck

(10) Patent No.: US 12,121,009 B2
(45) Date of Patent: Oct. 22, 2024

(54) HIVE HELPER

(71) Applicant: Larry D. Beck, Ferndale, WA (US)

(72) Inventor: Larry D. Beck, Ferndale, WA (US)

( * ) Notice: Subject to any disclaimer, the term of this patent is extended or adjusted under 35 U.S.C. 154(b) by 0 days.

(21) Appl. No.: 18/156,614

(22) Filed: Jan. 19, 2023

(65) Prior Publication Data

US 2024/0245039 A1    Jul. 25, 2024

(51) Int. Cl.
*A01K 47/00* (2006.01)
*A01K 47/06* (2006.01)

(52) U.S. Cl.
CPC ................... *A01K 47/06* (2013.01)

(58) Field of Classification Search
CPC .......... A01K 49/00; A01K 51/00; B66D 1/28; B66D 1/46; B66D 1/60; B66D 1/7405; B66C 17/06

See application file for complete search history.

(56) References Cited

U.S. PATENT DOCUMENTS

| | | | | |
|---|---|---|---|---|
| 1,025,833 A | * | 5/1912 | Peterson | B66F 9/19 |
| 2013/0075157 A1 | * | 3/2013 | Casadei | E02F 9/20 |
| 2013/0343849 A1 | * | 12/2013 | Gobert | B60P 1/54 |
| 2021/0323767 A1 | * | 10/2021 | Liu | B65G 1/137 |
| 2022/0103122 A1 | * | 3/2022 | Carter | H02S 99/00 |
| 2022/0201986 A1 | * | 6/2022 | Jeong | A01K 47/06 |

FOREIGN PATENT DOCUMENTS

| | | | | |
|---|---|---|---|---|
| DE | 202006007750 U1 | * | 8/2006 | A01K 59/00 |
| KR | 2017/0124923 A1 | * | 10/2016 | B66F 9/075 |
| WO | WO 2009/117984 A1 | * | 10/2009 | B62B 1/14 |

\* cited by examiner

*Primary Examiner* — Joshua J Michener
*Assistant Examiner* — Henry Hooper Mudd
(74) *Attorney, Agent, or Firm* — Michael D. Eisenberg

(57) ABSTRACT

This machine is unique in that it is a personal battery powered hive lifting and handling assistant. It will lift a complete honeybee hive, or any portion of a hive the beekeeper wishes. A complete or a portion of a hive can be lifted and moved as the machine is power driven. The machine has a left and right-side windlass for precise hive lifting control. The lifting and lowering speed are steady and predictable, allowing hive components to be separated, sorted, and lowered into place with bee harm kept to a minimum. The machine has an open design so hive inspections can be accomplished from either side where windlass controls are within easy reach. This machine will allow beekeepers outside of their prime physical lifting age or condition to enjoy beekeeping.

8 Claims, 1 Drawing Sheet

HIVE HELPER

FIELD

This application is for a battery powered machine that will be used as a tool to assist in the care and working of honeybees by lifting or moving complete or portions of hives. This machine will make beekeeping easier, more efficient, and safer with less chance of physical injury.

BACKGROUND

People have been raising and caring for honeybees for thousands of years. Estimates are that 6 out of 10 bites of food we eat are due to honeybee pollination.

Beekeeping is currently enjoying an increase in popularity worldwide. Many people are interested in keeping bees as a backyard hobby. Some want a hive to ensure that their garden and flowers are adequately pollinated. Others as an interesting hobby to supplement their retirement years. Some manage honeybees to rent out their colonies for pollination services.

Beekeeping is very rewarding but can be physically demanding. In the early spring when colonies have nearly depleted all their winter stores hives are at their lightest weight of the season. Two adults in reasonably good shape can lift and move a complete two-story high quite easily. At this point in the season a solitary beekeeper cannot safely lift and move a complete hive without help.

As the beekeeping year progresses, hives grow and at their peak workforce can easily quadruple their early-season weight and hives may be stacked six or seven feet high. At this stage of the beekeeping season, it may become impossible for some beekeepers to properly and safely care for and manage their honeybee colonies. The weekly inspections of the brood chamber in the lower portions of the hive require the removal of perhaps hundreds of pounds of nectar and pollen stored in frames contained in the hive bodies above the nest. This can be difficult enough for a few hives, but not practical for a beekeeper with a few dozen hives to manage without help. Faced with the challenges of all the heavy lifting, some beekeepers adopt a "just let the bees figure it out" style of beekeeping. Some hives being left on their own may work out, but I've found this approach to beekeeping most often leads to numerous potential problems. A few of which are unintentional swarming, absconded colonies, queen less colonies, overcrowding and excessive varroa mites which will lead to disease and eventually loss of the colony.

SUMMARY

The machine described herein is a beekeeper's assistant. It is a re-chargeable, battery powered self-propelled hoist that can lift and move a desired portion, or an entire commonly used Langstroth vertically oriented 8 or 10 frame hive.

The machine can lift the complete portion of a hive above the brood nest vertically, holding it while the beekeeper performs a task. Upon task completion, the hoisted hive parts can be carefully and gently set back down on the lower hive sections without harming bees. This will greatly reduce the time and effort required to perform a hive inspection.

A partial or complete hive can be lifted and carried by using the power wheel drive.

Bee escapes can be easily installed below the honey supers by lifting the complete stack of supers.

During honey harvest, full honey supers can be lifted and transported.

DETAILED DESCRIPTION

Figures 1, 2:
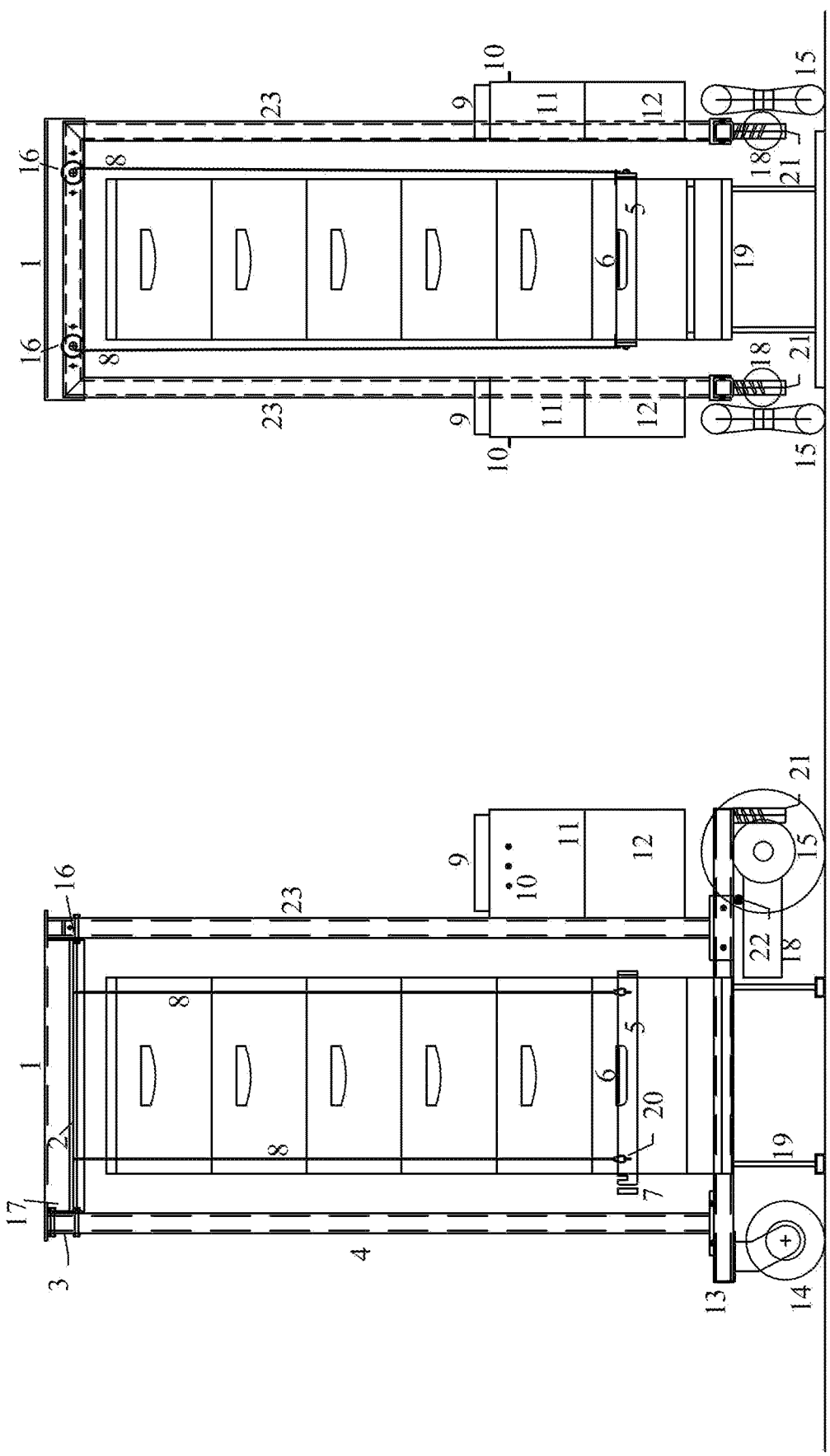
FIG. 1 is left side elevation of the machine.
FIG. 2 is the drive wheel end elevation.

FIG. 1 shows a side elevation of the machine. Item 19 is a typical 10 frame Langstroth hive on an 8" tall stand. For perspective this hive is comprised of 6 hive bodies stacked vertically. The machine is 4 wheeled, two being drive wheels 15, drive motor 18, motor attachment points 21 & 22, two are swivel style wheels 14. The wheels are attached to a pair of stainless-steel square tube, drive assembly 13, approximately 48 inches long, each having a swivel and drive wheel at opposite ends. This pair of wheel assemblies are bolted to the four vertical main frames 4 & 23 of stainless-steel square tubing which sets the wheel assemblies approximately 32" apart. This allows the machine to straddle over the top of the hive.

Bolted to the top of the approximately 66" vertical main frame is a rectangular aluminum frame made from angle bar called the windlass assembly 1. The windlass assembly is approximately 33" by 28½" and contains two 24-volt DC motors 3 approximately 20 inches apart, drive coupling 17, a ¾" diameter stainless-steel round bar windlass shaft 2, and bearings 16 for each motor. A pair of lifting lines 8 per windlass are wound. At the lower end of each line is a carabiner 20.

The two pairs of lifting line carabiners attach to the hive body engagement fork 5. The fork is made from ½"×2" stainless-steel bar bent and formed to fit either a standard Langstroth 10 frame or 8 frame hive body on two sides and one end only. The carabiner allows a quick switch between 10 and 8 frame forks depending on which hive is to be handled. The open end of the fork allows the device to engage the high body. The three-sided fork design allows the machine to drive up and engage the hive from the front or back. Additionally, a removable bar made from the same material and dimension as the engagement fork is machined to become the 4th side 7 completely capturing the hive body. Each end of the 4th side has a cope that matches with an opposite cope on fork 5. The 4th side gives the lift stability. This would be required to lift a hive body equipped with migratory style lifting bars common on some Langstroth hive bodies and a popular woodenware used by commercial pollinators. Located on the engagement fork and removable 4th side in locations corresponding to the hive bodies hand holds are the lifting hands 6. These are hinged to be safely out of the way while the fork is being positioned at the point where the lifting is to occur. Once the fork is positioned over the lifting hands milled into standard Langstroth hive bodies, the hinge stainless-steel hands can be engaged. When the windlass is raised with hands engaged, the hive body and the remaining hive above this point will be lifted. They will disengage once the load is released from the fork and be hinged again to a disengaged position. The lifting hands and hinge are made of stainless steel.

At 35 inches wide and 79 inches tall the hive helper is sized to be able to pass through a standard exterior pedestrian door.

Two deep cycle rechargeable 12 Volt batteries 12 wired in series (24 volt) will power the machine. They are located one on each side at the base of the main frame just above the drive wheels. Above each battery compartment is where the electrical components will be housed 11. Electrical components will include a main battery key disconnect switch, circuit breakers for the drive wheels and windlass, drive wheel control box, charging equipment and the moment toggle switches 10 to operate the two windlasses. Both battery and electrical compartment are made of stainless steel. The drive wheel control will be of the joystick type on an approximately 60-inch-long wire. The operator can walk beside the machine while traveling. Three toggle switches 10 will be required on each side of the machine for windlass control. Left side windlass control, right side windlass control and both windlasses simultaneously control on either side of the machine will allow the operator a variety of lifting options to accommodate hive placement in relation to the machine and to compensate for uneven ground conditions no doubt present in some apiaries. On the top of the electrical compartment on each side is an open beekeeper tool storage area 9.

My intent is for a model to include a solar powered charging option for remote apiaries lacking in AC power charging capabilities. A solar panel would permit the hive helper to charge with green energy. The panel would fasten to the top of the windlass assembly. This option would require the overall height of the hive helper to be lowered by the thickness of the solar panel to continue allowing clearance through doorways.

What is claimed is:

1. A mobile system for manipulating a multi-level beehive with vertically stacked boxes, the system comprising:
   two spaced apart tubes joined to four wheels;
   two pairs of vertical tubes, each pair of vertical tubes being joined to a respective one of the spaced apart tubes;
   a windlass assembly joined to tops of the vertical tubes and comprising two spaced apart motor-driven shafts, with two lifting lines wound around each of the shafts and configured to be selectively wound and unwound according to a rotation direction of the respective shafts;
   a three-sided engagement fork supported by the two pairs of lifting lines, wherein the fork has an open shape and is configured to surround the beehive from three sides and to be vertically positioned along the beehive via winding and unwinding of the lifting lines;
   a bar configured to be joined to the engagement fork to close the open shape and generate a closed quadrilateral enclosing the beehive from all four sides;
   locking units joined to at least two opposite sides of the closed quadrilateral and configured to enter hand holds notched on sides of the vertically stacked boxes, thereby locking the closed quadrilateral with any of the boxes, to lift the beehive or part of the beehive via an upward motion of the closed quadrilateral engaged with a desired box, the upward motion being driven by rotation the shafts lifting the lifting lines.

2. The mobile system of claim 1, wherein the windlass assembly comprises two motors, each configured to drive a respective one of the shafts independently of each other.

3. The mobile system of claim 2, comprising toggle switches, each configured to enable independent control of a respective one of the motors.

4. The mobile system of claim 2, comprising a battery unit comprising one or more batteries configured to power a respective one of the motors.

5. The mobile system of claim 1, wherein;
   the three-sided engagement fork comprises two first copes, each first cope located at a respective end of the open shape;
   the bar comprises two second copes configured to cooperate with two first copes to removably join the bar to the engagement fork.

6. The mobile system of claim 1, wherein two of the wheels are motorized drive wheels.

7. The mobile system of claim 6, wherein the two wheels that are not motorized are swivel wheels.

8. The mobile system of claim 1, comprising a solar panel configured to provide electrical power to the system.

* * * * *